US012200435B2

(12) United States Patent
Kakuhari et al.

(10) Patent No.: US 12,200,435 B2
(45) Date of Patent: Jan. 14, 2025

(54) SOUND REPRODUCTION DEVICE

(71) Applicant: Panasonic Intellectual Property Management Co., Ltd., Osaka (JP)

(72) Inventors: Isao Kakuhari, Nara (JP); Nobuhiko Washio, Osaka (JP); Takeshi Sakai, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 200 days.

(21) Appl. No.: 17/918,032

(22) PCT Filed: May 24, 2021

(86) PCT No.: PCT/JP2021/019645
§ 371 (c)(1),
(2) Date: Oct. 10, 2022

(87) PCT Pub. No.: WO2022/014166
PCT Pub. Date: Jan. 20, 2022

(65) Prior Publication Data

US 2023/0125931 A1 Apr. 27, 2023

(30) Foreign Application Priority Data

Jul. 13, 2020 (JP) ................................ 2020-119882
Aug. 28, 2020 (JP) ................................ 2020-144122

(51) Int. Cl.
*H04R 1/34* (2006.01)
*H04R 1/02* (2006.01)

(52) U.S. Cl.
CPC ............ *H04R 1/345* (2013.01); *H04R 1/026* (2013.01)

(58) Field of Classification Search
CPC ...... H04R 1/345; H04R 1/026; H04R 1/2823; H04R 1/021
See application file for complete search history.

(56) References Cited

U.S. PATENT DOCUMENTS

2008/0247553 A1 10/2008 Katayama
2012/0128190 A1* 5/2012 Tam ...................... H04R 1/283 381/346

FOREIGN PATENT DOCUMENTS

JP 7-154889 A 6/1995
JP 2006-101461 A 4/2006
JP 2015-154350 A 8/2015

OTHER PUBLICATIONS

International Search Report issued on Aug. 17, 2021 in International Patent Application No. PCT/JP2021/019645, with English translation.

* cited by examiner

*Primary Examiner* — Tuan D Nguyen
(74) *Attorney, Agent, or Firm* — Rimon P.C.

(57) ABSTRACT

A sound reproduction device includes a cabinet and a loudspeaker disposed inside the cabinet, the cabinet includes a baffle including a plurality of through holes provided in a ring-shaped area, and the loudspeaker is disposed in an orientation in which sound is emitted toward the plurality of through holes.

9 Claims, 8 Drawing Sheets

SOUND REPRODUCTION DEVICE

CROSS-REFERENCE OF RELATED APPLICATIONS

This application is the U.S. National Phase under 35 U.S.C. § 371 of International Patent Application No. PCT/JP2021/019645, filed on May 24, 2021, which in turn claims the benefit of Japanese Patent Application No. 2020-119882, filed on Jul. 13, 2020, and Japanese Patent Application No. 2020-144122, filed Aug. 28, 2020, the entire disclosures of which Applications are incorporated by reference herein.

TECHNICAL FIELD

The present disclosure relates to a sound reproduction device capable of emitting sound having directionality.

BACKGROUND ART

Patent Literature 1 and Patent Literature 2 disclose structures that realize an auditory effect as if a loudspeaker is located in a direction different from that of an actual position of the loudspeaker, by controlling a volume and phase of acoustic signals input to the loudspeaker so that acoustic characteristics in the vicinity of a head of a user become similar to acoustic characteristics of incoming sound from a desired direction.

CITATION LIST

Patent Literature

[PTL 1]
Japanese Unexamined Patent Application Publication No. 2006-101461
[PTL 2]
Japanese Unexamined Patent Application Publication No. 2015-154350

SUMMARY OF INVENTION

Technical Problem

There is a system in which a large number of loudspeakers are provided for emitting sound having directionality. In this system, however, there is a problem that a large number of loudspeakers need to be provided.

The present disclosure aims at providing a sound reproduction device capable of emitting sound having directionality with a smaller number of loudspeakers.

Solution to Problem

A sound reproduction device according to the present disclosure includes a casing and a loudspeaker disposed inside the casing, wherein the casing includes a first wall surface including a plurality of through holes provided in a ring-shaped area, and the loudspeaker is in an orientation in which sound is emitted toward the plurality of through holes.

Advantageous Effects of Invention

According to the sound reproduction device of the present disclosure, it is possible to realize a sound reproduction device capable of emitting sound having directionality with a smaller number of loudspeakers.

DESCRIPTION OF EMBODIMENTS

Figure 1A:
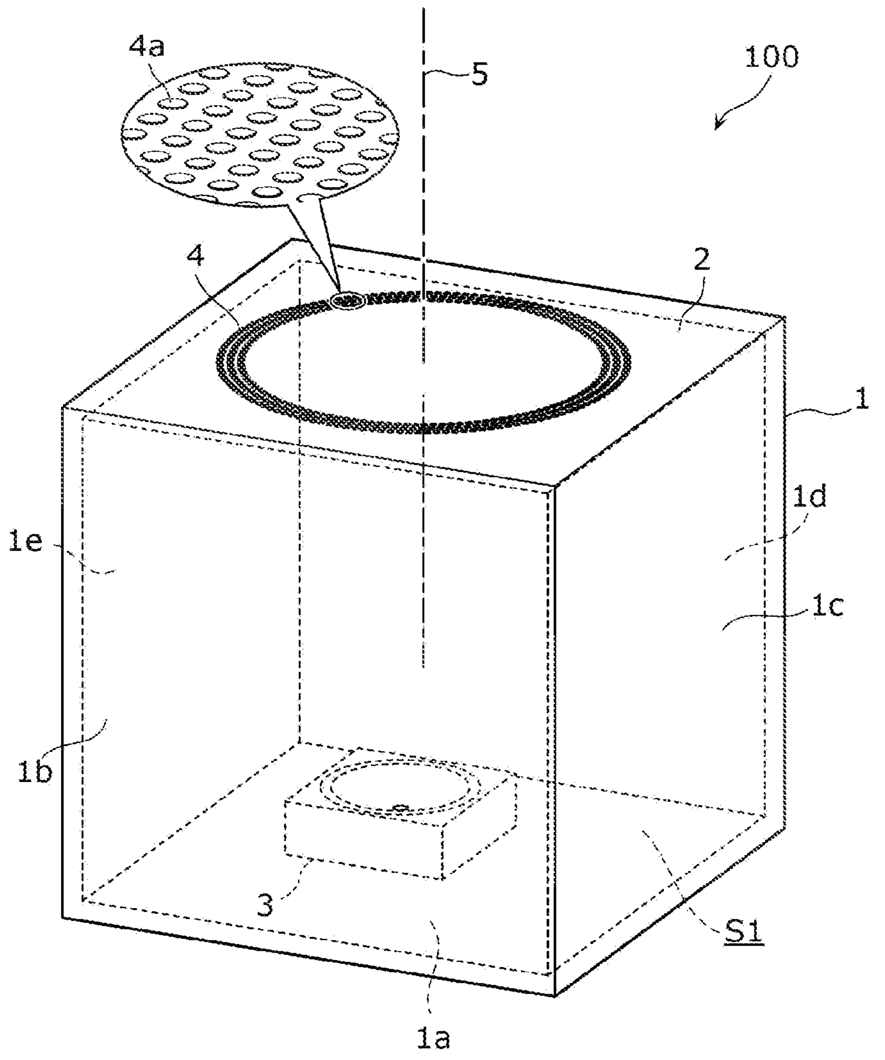
FIG. 1A is a perspective view showing a structure of a sound reproduction device according to Embodiment 1.

A sound reproduction device according to an embodiment of the present disclosure includes a casing and a loudspeaker disposed inside the casing. The casing includes a first wall surface including a plurality of through holes provided in a ring-shaped area, and the loudspeaker is in an orientation in which sound is emitted toward the plurality of through holes.

Accordingly, since sound of a specific frequency band corresponding to a size of the plurality of through holes is emitted from each of the plurality of through holes, each of the through holes becomes a sound source. Therefore, the plurality of through holes provided annularly exert an effect similar to that of a loudspeaker array provided two-dimensionally in an annular shape. Thus, sound of the specific frequency band emitted from each of the plurality of through holes is intensified on a center axis as a center of the ring-shaped area, which is vertical to the first wall surface, with the result that the sound reproduction device can emit sound of the specific frequency band, which is sound having directionality in a direction of the center axis.

In addition, the plurality of through holes may include a plurality of first through holes provided along a first circle, the plurality of first through holes having hole diameters that are same and lengths that are same.

Therefore, it becomes possible to emit, from the plurality of first through holes, sound of a frequency band corresponding to the hole diameter and length of the plurality of first through holes, which is sound having directionality in a direction of a center axis of the first circle.

In addition, the plurality of through holes may include a plurality of second through holes provided along a second circle that is inside the first circle and is smaller than the first circle, the plurality of second through holes having hole diameters smaller than the hole diameters of the plurality of first through holes.

Therefore, it becomes possible to emit, from the plurality of second through holes, sound of a frequency band including a frequency band higher than the specific frequency band of the sound emitted from the plurality of first through holes, which is sound having directionality in a direction of a center axis of the second circle. As a result, sound of a wide frequency band obtained by combining the frequency band to be emitted from the plurality of first through holes and the frequency band to be emitted from the plurality of second through holes can be emitted in the direction of the center axis.

In addition, the second circle may be concentric with the first circle.

Therefore, sound to be emitted from the plurality of first through holes and sound to be emitted from the plurality of second through holes can be emitted toward the same center axis.

In addition, the casing may include a first space in which the loudspeaker is disposed and a second space through which the first space communicates with an external space outside the casing, and the second space may be a cylindrical space formed between an outer wall surface in a cylindrical shape provided along an inner circumference of the ring-shaped area and an inner wall surface in a cylindrical shape that is provided along an outer circumference of the ring-shaped area and opposes the outer wall surface.

Accordingly, sound emitted from the loudspeaker enters the second space between the outer wall surface and the inner wall surface to propagate through the second space, and thus it becomes easier for wavefronts of the sound to be aligned vertical to the outer wall surface and the inner wall surface and the sound to vertically enter the plurality of through holes. Sound of a resonance frequency determined by the hole diameter and length of the plurality of through holes and a volume of the casing resonates at a larger level in a narrower frequency band due to the wavefronts of the sound vertically entering the plurality of through holes. Thus, emission sound of the specific frequency band can be emitted to the outside of the casing at a large volume.

In addition, a center axis of the cylindrical shape formed by the outer wall surface and a center axis of the cylindrical shape formed by the inner wall surface may coincide.

Therefore, it becomes possible to make frequency characteristics of the sound emitted from the plurality of through holes uniform.

In addition, a distance between the outer wall surface and the inner wall surface may be constant in a direction of the center axis of the cylindrical shape of the outer wall surface.

Therefore, it becomes possible to make frequency characteristics of the sound emitted from the plurality of through holes uniform.

In addition, a distance between the outer wall surface and the inner wall surface may be smaller than or equal to ¼ a wavelength of sound emitted from the loudspeaker.

In addition, the loudspeaker may be disposed in an orientation in which a center axis of the loudspeaker in a sound emission direction passes through a center of the ring-shaped area.

Accordingly, since the loudspeaker is disposed such that the center axis thereof passes through the center axis of the ring-shaped area, the distance between the loudspeaker and each of the plurality of through holes can be made uniform. As a result, it becomes possible to set sound pressures and phases of the plurality of sounds emitted from the plurality of through holes to become closer to one another and further enhance the effect in which the sound of the specific frequency band emitted from each of the plurality of through holes is intensified on the center axis of the ring-shaped area.

In addition, the casing may include an opening portion in a second wall surface different from the first wall surface, the opening portion being a portion from which sound emitted from the loudspeaker is emitted to outside.

Accordingly, sound emitted from the loudspeaker is frequency-selected by the plurality of through holes so that the sound can be reproduced after being separated into sound having directionality in the direction of the center axis of the ring-shaped area, which is vertical to the first wall surface, and sound to be emitted from the opening portion. Therefore, a three-dimensional acoustic effect can be realized with a single loudspeaker.

Hereinafter, embodiments of the present disclosure will be described in detail with reference to the drawings.

Embodiment 1

Figure 1B:
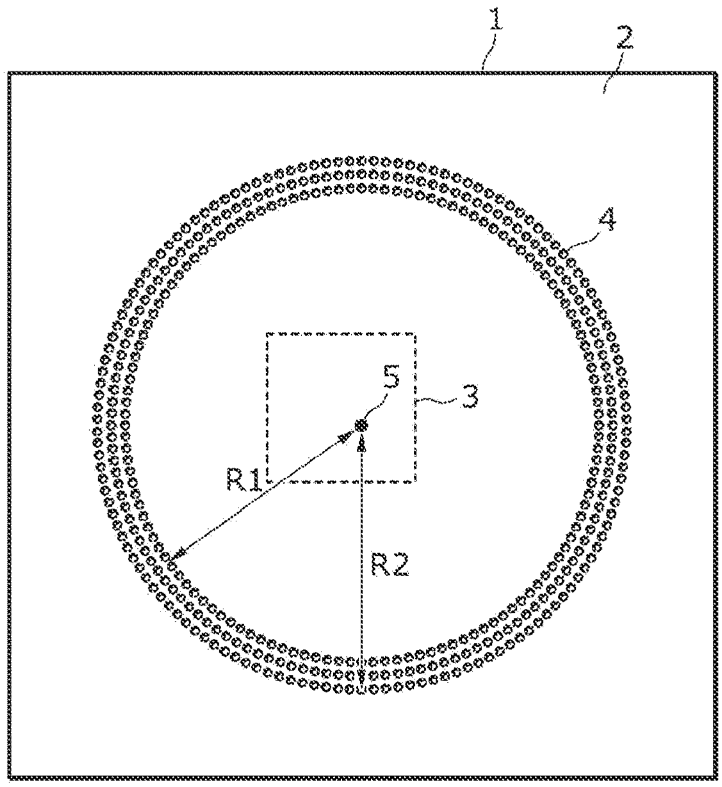
FIG. 1B is a plan view of a baffle in the sound reproduction device according to Embodiment 1.

FIG. 1A is a perspective view showing a structure of sound reproduction device 100 according to Embodiment 1. FIG. 1B is a plan view of baffle 2 in sound reproduction device 100 according to Embodiment 1.

Sound reproduction device 100 includes cabinet 1 and loudspeaker 3 disposed inside cabinet 1.

Cabinet 1 is a casing having a generally cuboid shape. For example, cabinet 1 includes 6 wall surfaces and a cuboid space inside. The 6 wall surfaces of cabinet 1 include baffle 2 as an upper surface, bottom surface 1*a* opposing baffle 2, and 4 side surfaces 1*b* to 1*e* that are provided between baffle 2 and bottom surface 1*a* and are connected to baffle 2 and bottom surface 1*a*. Each of the 6 wall surfaces is a plate-like member. A volume of cabinet 1 is represented by V.

Of cabinet 1, baffle 2 is a wall surface opposing the wall surface on which loudspeaker 3 is disposed (bottom surface 1*a* in this embodiment). A thickness of baffle 2 is represented by L as will be described later and is constant. Baffle 2 includes a plurality of through holes 4*a* provided in toric ring-shaped area 4. Baffle 2 is an example of a first wall surface. Each of the plurality of through holes 4*a* is a circular opening having a radius a. In other words, the plurality of through holes 4*a* have the same hole diameter. Each of the plurality of through holes 4*a* penetrates through baffle 2 vertically. Therefore, each of the plurality of through holes 4*a* has a length that is the same as thickness L of baffle 2. In other words, the plurality of through holes 4*a* have the same length.

Loudspeaker 3 is disposed on an inner wall side of one of the wall surfaces of cabinet 1 and emits sound inside cabinet 1. Loudspeaker 3 is disposed on bottom surface 1*a* such that a sound emission direction is directed toward baffle 2. In other words, loudspeaker 3 is disposed on bottom surface 1*a* in an orientation in which sound is emitted toward the plurality of through holes 4*a*. In addition, it is favorable for loudspeaker 3 to be disposed at a position on an inner side of ring-shaped area 4 when seeing sound reproduction device 100 from a direction of center axis 5.

It should be noted that as long as loudspeaker 3 is disposed such that the sound emission direction is directed toward baffle 2, loudspeaker 3 does not need to be disposed on bottom surface 1*a* and may be disposed at a position apart from bottom surface 1*a*. For example, the cabinet of the sound reproduction device may include a support member that is fixed to at least one of bottom surface 1*a*, side surfaces 1*b* to 1*e*, and baffle 2, and loudspeaker 3 may be disposed on that support member such that the sound emission direction is directed toward baffle 2.

In addition, of baffle 2, ring-shaped area 4 is a toric area that has center axis 5 as a center and whose radius is within a predetermined range, and the plurality of through holes 4*a* are provided in that area. Center axis 5 is a virtual line that passes through a center of a surface formed by baffle 2 and is vertical to this surface. The expression "radius is within a predetermined range" specifically refers to a range from radius R1 or more to radius R2 or less as shown in FIG. 1B.

It should be noted that the shape of ring-shaped area 4 where the plurality of through holes 4*a* are provided only needs to be annular and may be polygonal without being limited to a toric shape. The plurality of through holes 4*a* only need to be provided in ring-shaped area 4. In addition, the plurality of through holes 4*a* are not provided in areas other than ring-shaped area 4. In other words, the plurality of through holes 4*a* are not provided inside a circle that has center axis 5 as a center and has radius R1 and are not provided outside a circle that has center axis 5 as a center and has radius R2.

Further, the plurality of through holes 4*a* may be provided along a circle that has center axis 5 as a center. The plurality of through holes 4*a* may be provided along a plurality of circles having center axis 5 as a center. It should be noted that the plurality of through holes 4*a* only need to be arranged along a circle that has center axis 5 as a center and may be arranged at positions deviated from the circle.

Furthermore, the plurality of through holes 4*a* may be provided such that an opening ratio becomes constant in any area of ring-shaped area 4. The opening ratio is a sum of areas of the plurality of through holes 4*a* per unit area of ring-shaped area 4. In addition, the plurality of through holes 4*a* do not need to be arranged along the circle as long as the plurality of through holes 4*a* are provided in ring-shaped area 4 with a constant opening ratio. For example, the plurality of through holes 4*a* may be provided in arrays in two different linear directions. In other words, baffle 2 may have a structure in which the plurality of through holes 4*a* arranged in arrays are provided only in ring-shaped area 4.

It should be noted that the shape of cabinet 1 in this embodiment is generally a cuboid shape, but as long as a positional relationship between loudspeaker 3 and the plurality of through holes 4*a* is as described above, the shape may be any shape, for example, a columnar shape or a polygonal columnar shape.

With this structure, sound emitted from loudspeaker 3 is emitted to the outside of cabinet 1 via the plurality of through holes 4*a* of ring-shaped area 4. The sound that has been emitted from loudspeaker 3 and propagated to the plurality of through holes 4*a* resonates at resonance frequency f that is determined based on radius a and length L (corresponding to thickness of baffle 2) of the respective through holes 4*a* and volume V of cabinet 1. Therefore, the sound of resonance frequency f is emitted to the outside of cabinet 1 at a volume larger than that of sound of frequencies other than resonance frequency f.

Figure 2:
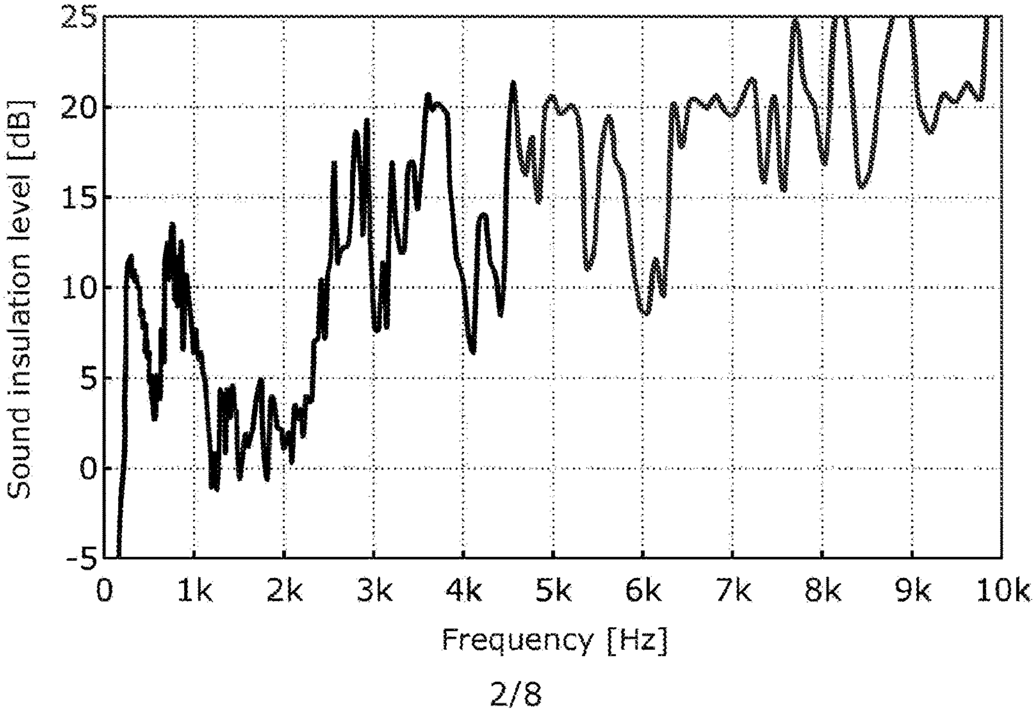
FIG. 2 is a graph showing a sound insulation effect of the baffle in which a plurality of through holes are provided.

FIG. 2 is a graph showing a sound insulation effect of the baffle in which the plurality of through holes are provided. Specifically, FIG. 2 shows a difference between an emission sound level of a sound reproduction device in a case where baffle 2 is removed from cabinet 1 and an emission sound level of a sound reproduction device including baffle 2 in which a total of 400 through holes 4*a* having radius a of 2.5 mm are provided at regular intervals on baffle 2 having thickness L of 10 mm (sound insulation level of plate in which 400 small openings each having radius a of 2.5 mm and length L of 10 mm are provided). It can be seen from the figure that the difference is small at a frequency band of 1 kHz or more and smaller than 2.5 kHz, and the sound insulation level is large at a frequency band of 200 Hz or more and smaller than 1 kHz and a frequency band of 2.5 kHz or more. This specifically means that as a result of the sound emitted from loudspeaker 3 being frequency-selected by the plurality of through holes 4*a*, sound at the frequency band of 1 kHz or more and smaller than 2.5 kHz is emitted to the outside of cabinet 1 without being attenuated relatively as compared to sound of other frequency bands.

It should be noted that the frequency band of sound to be emitted to the outside can be set to become higher as the radius of the plurality of through holes 4*a* becomes smaller. By adjusting the radius of the plurality of through holes 4*a* as described above, sound of a desired frequency band can be emitted to the outside of cabinet 1.

Since sound of a specific frequency band corresponding to the hole diameter and length of the plurality of through holes 4*a* is emitted from each of the plurality of through holes 4*a* in sound reproduction device 100 according to this embodiment, each of the plurality of through holes 4*a* becomes a sound source. Therefore, the plurality of through holes 4*a* provided in a toric shape exert an effect similar to that of a loudspeaker array provided two-dimensionally in a toric shape. Thus, sound of the specific frequency band emitted from each of the plurality of through holes 4*a* is intensified on center axis 5, with the result that sound reproduction device 100 can emit sound of the specific frequency band, that has directionality in the direction of center axis 5.

Embodiment 2

Figure 3:
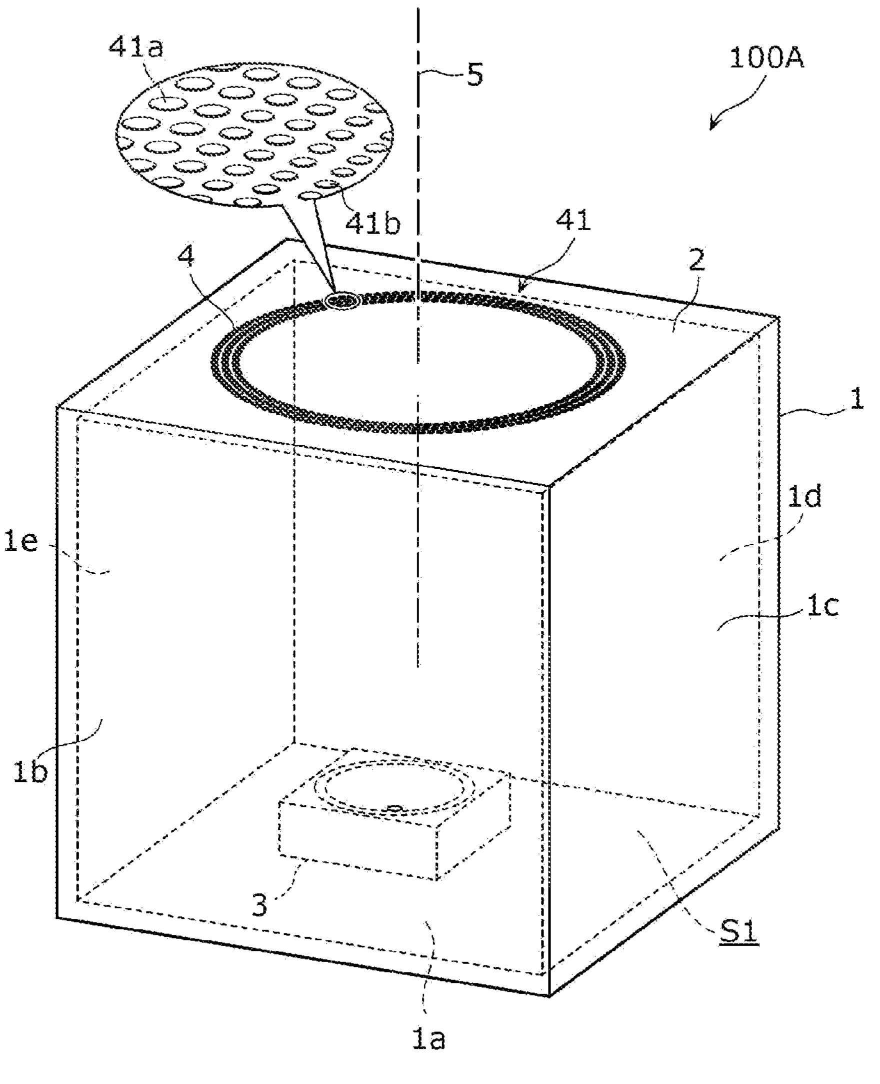
FIG. 3 is a perspective view showing a structure of a sound reproduction device according to Embodiment 2.

FIG. 3 is a perspective view showing a structure of a sound reproduction device according to Embodiment 2.

Sound reproduction device 100A of this embodiment has the same structure as sound reproduction device 100 according to Embodiment 1 except for a structure of a plurality of through holes 41*a*. Therefore, descriptions will mainly be given on the different structure, and descriptions on the same structure will be omitted.

In FIG. 3, a plurality of through holes 41 provided in baffle 2 include the plurality of through holes 41*a* arranged on a first circle and a plurality of through holes 41*b* arranged on a second circle inside the first circle. The plurality of through holes 41 are provided at regular intervals while being concentric with center axis 5. The plurality of through holes 41 include the plurality of through holes 41*a* and the plurality of through holes 41*b* having different opening radiuses. On a circumference of a circle having a certain radius with center axis 5 being a center, through holes having the same radius are provided. For example, of ring-shaped area 4 having a radius of R1 or more and R2 or less with center axis 5 being a center, the plurality of through holes 41*a* having radius r1 are provided annularly on the first circle on an outer circumference side, and the plurality of through holes 41*b* having radius r2 are provided annularly on the second circle on an inner circumference side.

The second circle is smaller than the first circle. The second circle may be concentric with the first circle. In other words, the first circle and the second circle may be circles that have center axis 5 as the center. It should be noted that the second circle does not need to be concentric with the first circle as long as it is included in the first circle. In addition, the first circle and the second circle are provided in ring-shaped area 4 having the radius of R1 or more and R2 or less.

The lengths of the plurality of through holes 41 are all L which is the thickness of baffle 2.

It should be noted that in this embodiment, the plurality of through holes 41 only need to include the plurality of through holes 41*a* and 41*b* having different radiuses (i.e., different hole diameters), and the through holes having the same radius (i.e., same hole diameter) only need to be provided on circumferences of circles having the same radius. Therefore, for example, the through holes having the same radius may be provided on circumferences of circles having different radiuses. Specifically, the plurality of through holes 41*a* arranged on the first circle have the same hole diameter (e.g., radius r1). It should be noted that the plurality of through holes 41*a* only need to be arranged along the first circle and may be arranged at positions deviated from the first circle. In addition, the plurality of through holes 41*b* arranged on the second circle have the same hole diameter (e.g., radius r2), and this hole diameter is smaller than the hole diameter of the plurality of through holes 41*a*. It should be noted that the plurality of through holes 41*b* only need to be arranged along the second circle and may be arranged at positions deviated from the second circle.

Since the hole diameter of the plurality of through holes 41*a* and that of the plurality of through holes 41*b* differ in sound reproduction device 100A of this embodiment, a plurality of frequency bands are selected (emitted) by baffle 2. Thus, sound reproduction device 100A can emit sound that has a wider frequency band and has directionality in the direction of center axis 5.

Embodiment 3

Figure 4:
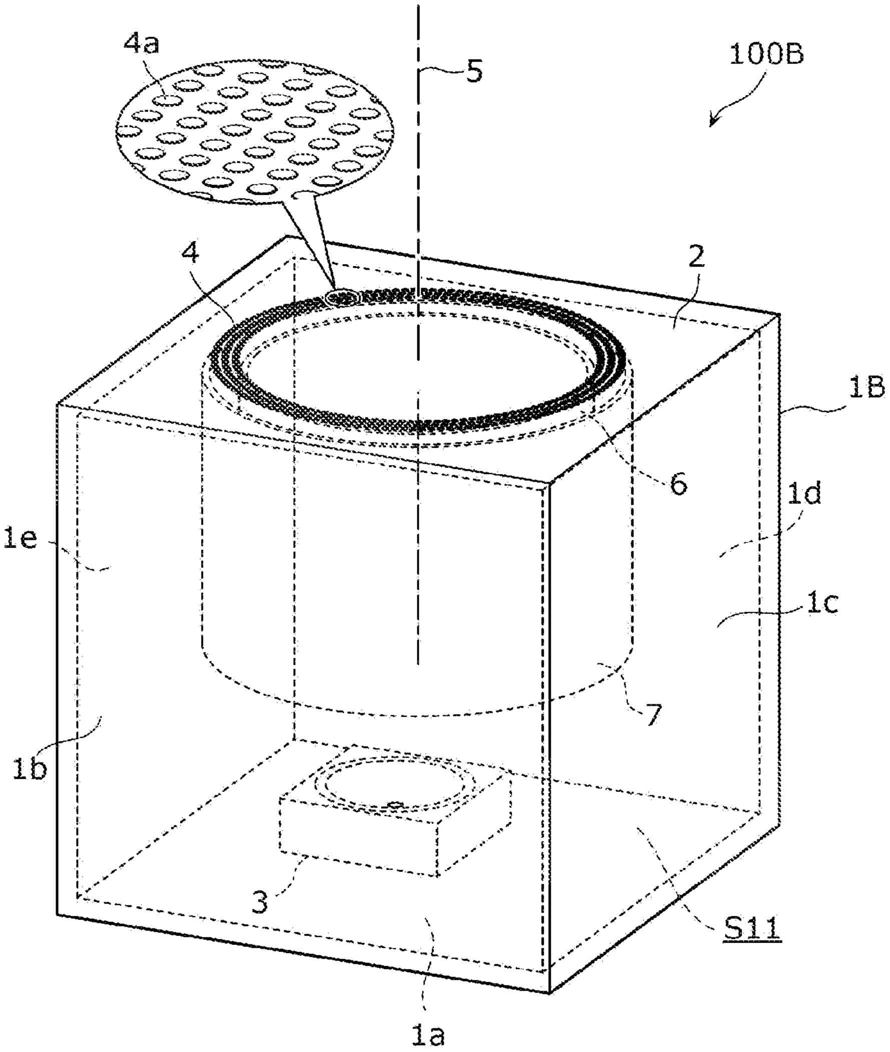
FIG. 4 is a perspective view showing a structure of a sound reproduction device according to Embodiment 3.
Figure 5:
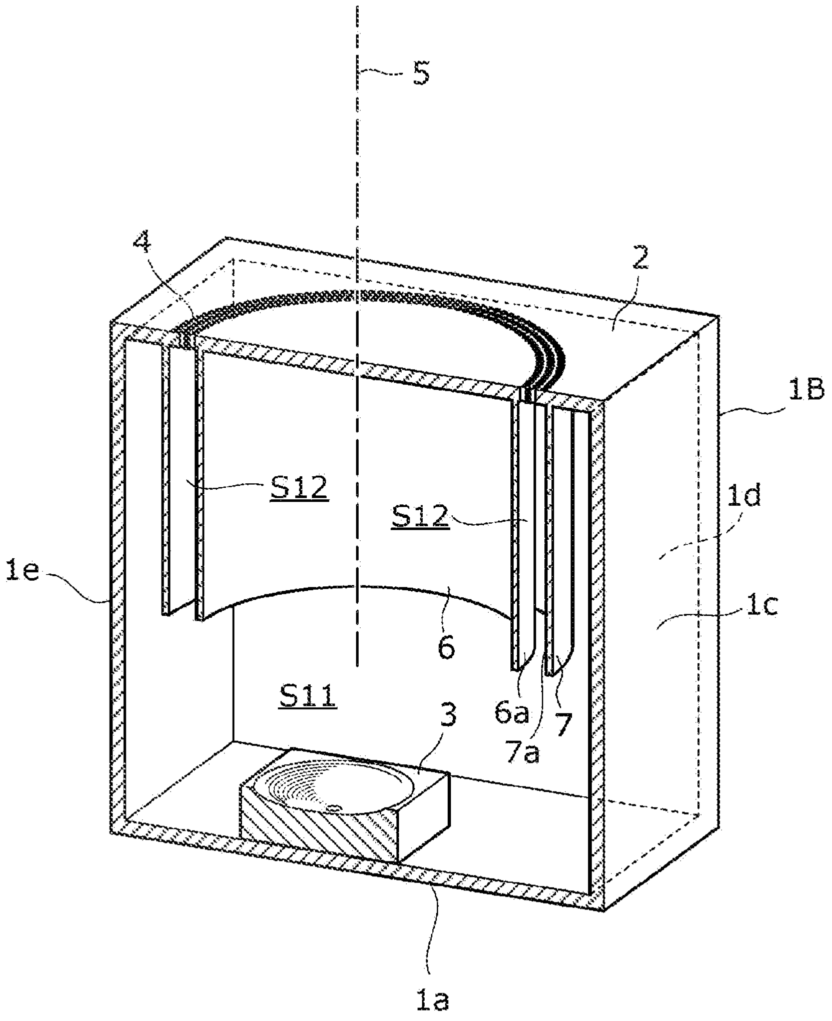
FIG. 5 is a cross-sectional view of the sound reproduction device according to Embodiment 3.

FIG. 4 is a perspective view showing a structure of a sound reproduction device according to Embodiment 3. FIG. 5 is a cross-sectional view of the sound reproduction device according to Embodiment 3.

Sound reproduction device 100B of this embodiment has the same structure as sound reproduction device 100 according to Embodiment 1 except that cylindrical space S12 is formed inside cabinet 1B. Therefore, descriptions will mainly be given on the different structure, and descriptions on the same structure will be omitted.

Cabinet 1B includes space S11 and space S12. Space S11 is a space where loudspeaker 3 is disposed. Space S11 is a portion obtained by removing space S12 from internal space S1 formed by 6 wall surfaces (bottom surface 1*a*, side surfaces 1*b* to 1*e*, and baffle 2) of cabinet 1B. Space S12 is provided more on the baffle 2 side than space S11 and brings space S11 and an external space outside cabinet 1B in communication with each other. Specifically, space S12 is a cylindrical space formed between outer wall surface 6*a* of inner wall 6 and inner wall surface 7*a* of outer wall 7 opposing outer wall surface 6*a*. Cabinet 1B includes inner wall 6 and outer wall 7 in addition to bottom surface 1*a*, side surfaces 1*b* to 1*e*, and baffle 2. In other words, cabinet 1B differs from cabinet 1 according to Embodiment 1 in the point of including inner wall 6 and outer wall 7.

Inner wall 6 has a cylindrical shape. Inner wall 6 has one end thereof connected to baffle 2 and is provided in cabinet 1B such that outer wall surface 6*a* of inner wall 6 is positioned along an inner circumference of toric ring-shaped area 4. The other end of inner wall 6 is not in contact with an inner surface (bottom surface 1*a*) of cabinet 1B, and a gap (space S11) is provided between the other end of inner wall 6 and the inner surface (bottom surface 1*a*) of cabinet 1B.

Outer wall 7 has a cylindrical shape that has an inner diameter larger than an outer diameter of inner wall 6. Outer wall 7 has one end thereof connected to baffle 2 and is provided in cabinet 1B such that inner wall surface 7*a* of outer wall 7 is positioned along an outer circumference of toric ring-shaped area 4. The other end of outer wall 7 is not in contact with the inner surface (bottom surface 1*a*) of cabinet 1B, and the gap (space S11) is provided between the other end of outer wall 7 and the inner surface (bottom surface 1*a*) of cabinet 1B.

Similar to Embodiment 1, out of baffle 2, the plurality of through holes 4*a* are provided in ring-shaped area 4 having a radius of R1 or more and R2 or less with center axis 5 being a center. Therefore, the outer diameter of inner wall 6 is equal to a value obtained by doubling radius R1. In addition, the inner diameter of outer wall 7 is equal to a value obtained by doubling radius R2. In other words, inner wall 6 and outer wall 7 form a double-layer cylinder in which inner wall 6 is an inner cylinder of the double-layer cylinder and outer wall 7 is an outer cylinder of the double-layer cylinder. Heights of inner wall 6 and outer wall 7 are the same. Thus, space S12 formed between inner wall 6 and outer wall 7 extends toward an inner (bottom surface 1*a*) side of cabinet 1B from ring-shaped area 4 of baffle 2 where the plurality of through holes 4*a* are provided. In other words, of baffle 2, ring-shaped area 4 is provided in an area between a portion where inner wall 6 is connected and a portion where outer wall 7 is connected.

In addition, inner wall 6 and outer wall 7 are provided inside cabinet 1B while being parallel to each other. In other words, a distance between outer wall surface 6*a* of inner wall 6 and inner wall surface 7*a* of outer wall 7 in a direction orthogonal to center axis 5 (radial direction) is constant in a direction parallel to center axis 5 (axial direction). Further, inner wall 6 and outer wall 7 have center axis 5 as an axis. In other words, a center axis of the cylindrical shape formed by outer wall surface 6*a* and a center axis of the cylindrical shape formed by inner wall surface 7*a* coincide. Therefore, frequency characteristics of sound emitted from the plurality of through holes 4*a* can be made uniform.

In addition, the distance between outer wall surface 6*a* and inner wall surface 7*a* may be smaller than or equal to ¼ the wavelength of sound to be emitted from loudspeaker 3.

Figure 6:
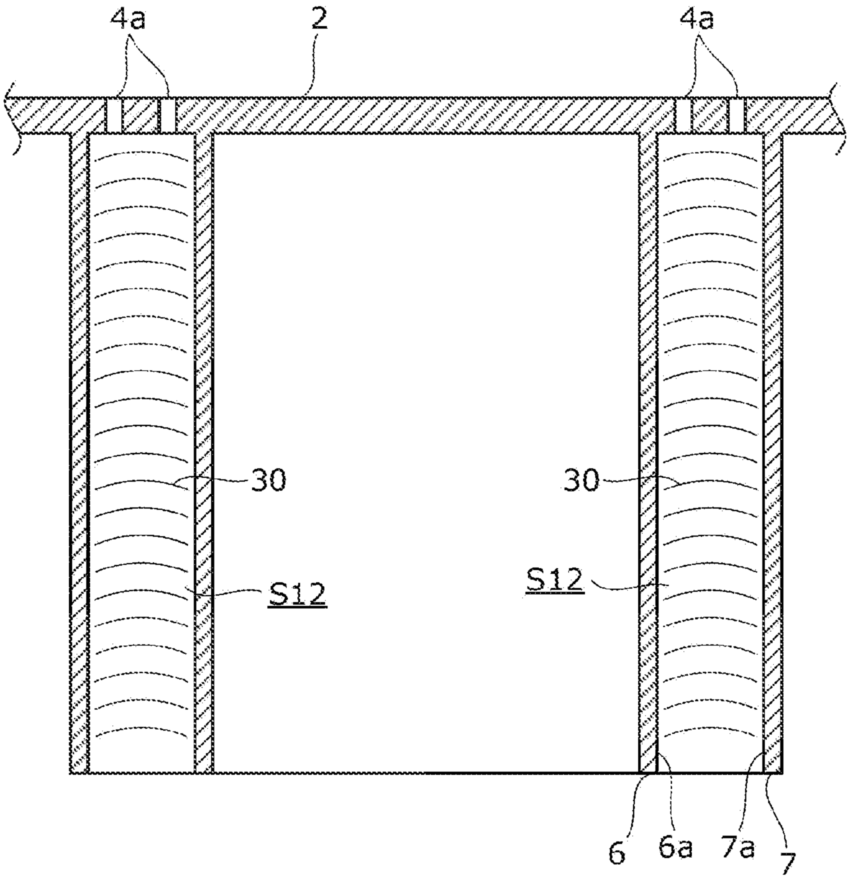
FIG. 6 is a schematic diagram showing sound waves that pass through a cylindrical space.

In sound reproduction device 100B of this embodiment, sound emitted from loudspeaker 3 enters the space between inner wall 6 and outer wall 7 and propagates between inner wall 6 and outer wall 7 as shown in FIG. 6, with the result that it becomes easier for wavefronts 30 of the sound to be aligned vertical to respective wall surfaces 6*a* and 7*a* of inner wall 6 and outer wall 7 and thus vertically enter the plurality of through holes 4*a*. Sound of resonance frequency f that is determined based on radius a and length L of the plurality of through holes 4*a* and volume V of cabinet 1B resonates at a large level in a narrower frequency band due to wavefronts 30 of the sound vertically entering the plurality of through holes 4*a*, with the result that emission sound of the selected frequency band can be emitted to the outside of cabinet 1B at a larger volume.

It should be noted that cylindrical space S12 interposed between inner wall 6 and outer wall 7 may be sectioned into ducts in a circumferential direction of space S12 by wall surfaces extending in the radial direction of inner wall 6 and outer wall 7. Accordingly, it goes without saying that, even in the case of sound of a higher frequency band, it becomes easier for wavefronts of the sound that passes through space S12 to be aligned vertical to respective wall surfaces 6*a* and 7*a* of inner wall 6 and outer wall 7 to thus vertically enter the plurality of through holes 4*a*.

In addition, a sound absorber may be provided in space S12 interposed between inner wall 6 and outer wall 7. Accordingly, the frequency band of sound to be emitted from the plurality of through holes 4*a* can be restricted.

It should be noted that inner wall 6 and outer wall 7 do not need to be cylindrical and may be of a polygonal columnar shape.

In addition, space S12 provided more on the baffle 2 side than space S11 only needs to be of a cylindrical shape, and the cylindrical shape does not need to be a shape that has a constant diameter in the direction parallel to center axis 5 (axial direction). The cylindrical shape of space S12 may be, for example, a shape in which the diameter becomes larger as it comes closer to baffle 2 or a shape in which the diameter becomes smaller as it comes closer to baffle 2.

It should be noted that although the spaces are provided inside inner wall 6 and between outer wall 7 and side surfaces 1*b* to 1*e* of cabinet 1B, the structure is not limited thereto, and a structure in which the space inside inner wall 6 is filled with an object and the space between outer wall 7 and side surfaces 1*b* to 1*e* of cabinet 1B is filled with an object may also be employed. In other words, as long as cabinet 1B includes cylindrical space S12 formed between outer wall surface 6*a* and inner wall surface 7*a*, at least one of the space inside inner wall 6 and the space between outer wall 7 and side surfaces 1*b* to 1*e* of cabinet 1B may be filled with an object or does not need to be filled with an object. It should be noted that the object to be filled may be constituted of the same material as cabinet 1B or may be constituted of a different material.

It should be noted that although cabinet 1B according to this embodiment includes baffle 2 that is the same as that of cabinet 1 according to Embodiment 1, the structure is not limited thereto, and baffle 2 that is the same as that of cabinet 1 according to Embodiment 2 may be provided instead.

Embodiment 4

Figure 7:
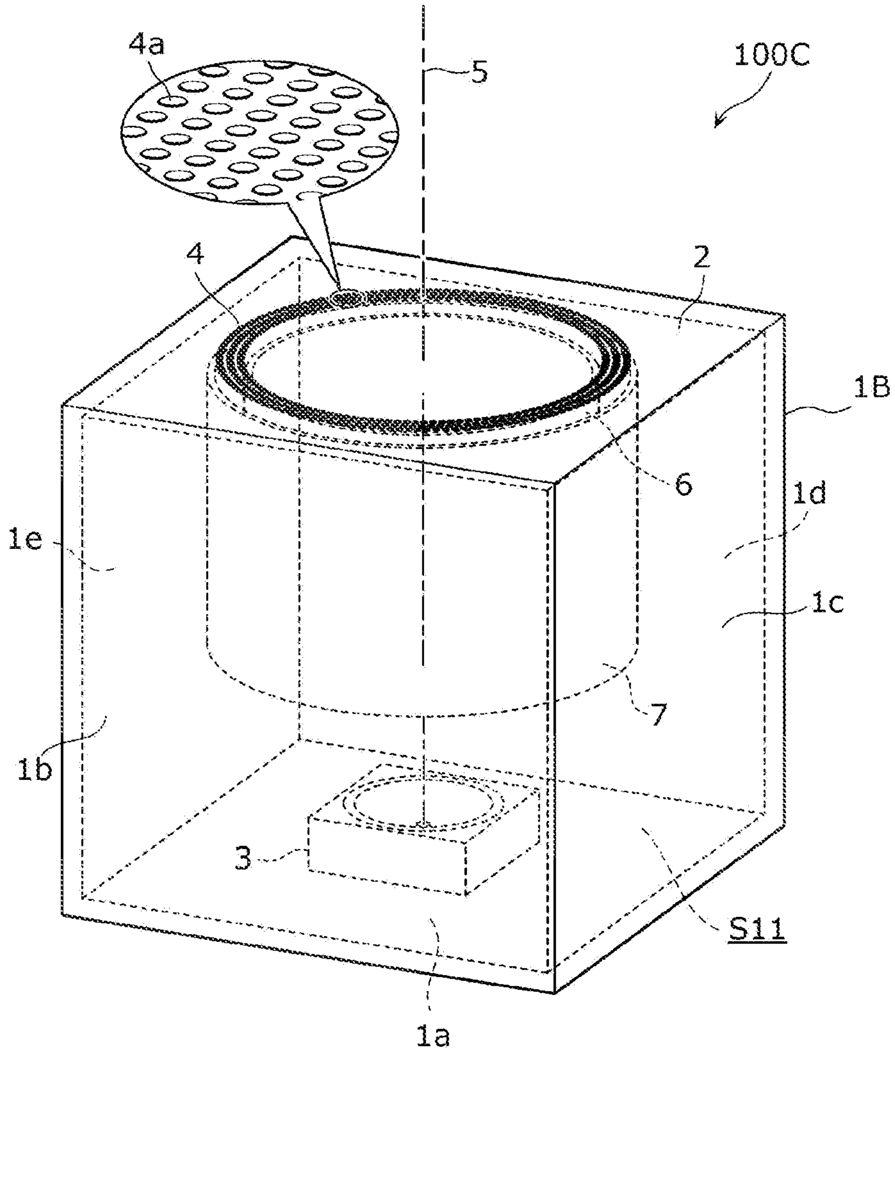
FIG. 7 is a perspective view showing a structure of a sound reproduction device according to Embodiment 4.

FIG. 7 is a perspective view showing a structure of a sound reproduction device according to Embodiment 4.

Sound reproduction device 100C according to this embodiment differs from sound reproduction device 100B according to Embodiment 3 in that loudspeaker 3 is disposed such that the center of loudspeaker 3 coincides with center axis 5. More specifically, loudspeaker 3 is disposed in an orientation in which the center axis of loudspeaker 3 in the sound emission direction passes through center axis 5 while being directed toward baffle 2.

Since loudspeaker 3 is disposed such that the center axis thereof passes through center axis 5 in sound reproduction device 100C according to this embodiment, a distance between loudspeaker 3 and an annular inlet of space S12 becomes the same at any position in a circumferential direction of the inlet. Therefore, of sound emitted from loudspeaker 3, direct sound having a highest sound pressure level enters the space between inner wall 6 and outer wall 7 with substantially the same sound pressure and substantially the same phase and propagates between inner wall 6 and outer wall 7, with the result that it becomes easier for wavefronts of the sound to be aligned vertical to respective wall surfaces 6*a* and 7*a* of inner wall 6 and outer wall 7 and thus be emitted to the outside of cabinet 1 via the plurality of through holes 4*a*. As described above, the sound pressures and phases of the plurality of sounds emitted from the plurality of through holes 4*a* can be made to come closer to one another, and thus the effect of intensifying sound of a specific frequency band that has been emitted from the plurality of through holes 4*a* on center axis 5 can be additionally enhanced. Thus, sound reproduction device 100C can emit sound having directionality in the direction of center axis 5 with higher accuracy.

It should be noted that similar to this embodiment, it is also possible to arrange loudspeaker 3 such that the center axis of loudspeaker 3 coincides with the center axis of baffle 2 in other embodiments. In this case, since the center axis of loudspeaker 3 passes through center axis 5 of ring-shaped area 4, the distance between loudspeaker 3 and each of the plurality of through holes 4*a* can be made the same. Accordingly, the sound pressures and phases of the plurality of sounds emitted from the plurality of through holes 4*a* can be made to come closer to one another, and thus the effect of intensifying sound of a specific frequency band that has been emitted from each of the plurality of through holes 4*a* on center axis 5 of ring-shaped area 4 can be additionally enhanced. Thus, the sound reproduction device in this case can emit sound of a specific frequency band, that has directionality in the direction of the center axis of the ring-shaped area with higher accuracy.

It should be noted that although cabinet 1B according to this embodiment includes baffle 2 that is the same as that of cabinet 1 according to Embodiment 1, the structure is not limited thereto, and baffle 2 that is the same as that of cabinet 1 according to Embodiment 2 may be provided instead.

Embodiment 5

Figure 8:
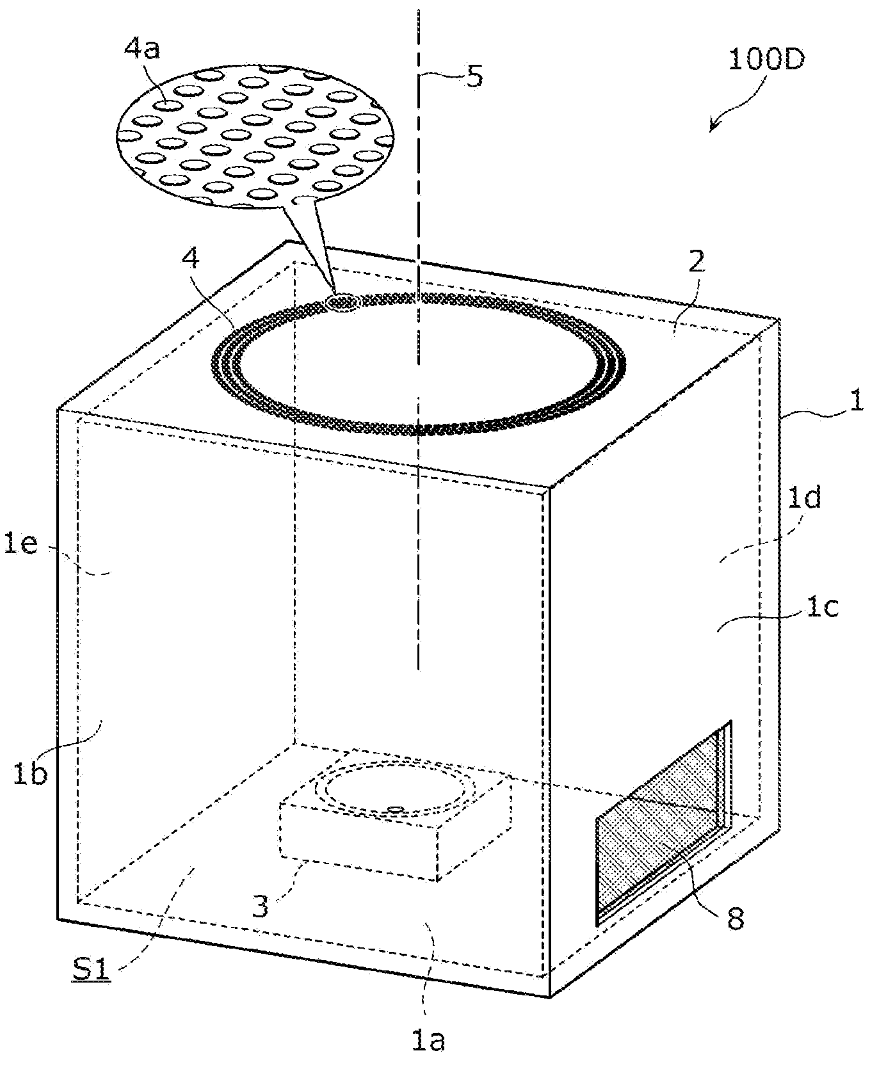
FIG. 8 is a perspective view showing a structure of a sound reproduction device according to Embodiment 5.

FIG. 8 is a perspective view showing a structure of a sound reproduction device according to Embodiment 5.

Sound reproduction device 100D according to this embodiment differs from sound reproduction device 100 according to Embodiment 1 in that opening portion 8 is provided in cabinet 1D. Opening portion 8 is provided on side surface 1*c* of cabinet 1D. Side surface 1*c* is an example of a second wall surface. It should be noted that opening portion 8 only needs to be provided on any of bottom surface 1*a* and side surfaces 1*b* to 1*e* as wall surfaces different from that on which baffle 2 is provided in cabinet 1D, and is not limited to being provided on side surface 1*c*.

In sound reproduction device 100D according to this embodiment, sound emitted from loudspeaker 3 can be frequency-selected by the plurality of through holes 4*a* provided in a toric shape so as to be reproduced after being separated into sound having directionality in the direction of center axis 5 and sound to be emitted from opening portion 8. Accordingly, upon reproducing natural environment sound including sound of a low frequency band like murmuring of a river and sound of a high frequency band like chirping of little birds while being set on a floor surface, for example, by emitting sound of the high frequency band upwardly so as to reflect the sound on a ceiling while reproducing sound of the low frequency band near the floor surface, sound reproduction device 100D can reproduce natural environment sound as if sound of murmuring of a river is heard from near the floor surface and sound of chirping of little birds is heard from near the ceiling. Therefore, a three-dimensional acoustic effect can be realized with a single loudspeaker.

It should be noted that cabinet 1 according to Embodiment 2 or cabinet 1B according to Embodiment 3 or 4 may include opening portion 8 provided in any of bottom surface 1*a* and side surfaces 1*b* to 1*e* as wall surfaces different from that on which baffle 2 is provided, similar to this embodiment.

Particularly in a case where cabinet 1B of sound reproduction devices 100B and 100C according to Embodiments 3 and 4 includes opening portion 8, other ends of inner wall 6 and outer wall 7 on the other side of ends connected to baffle 2 are provided at positions apart from the inner surface of cabinet 1B and loudspeaker 3. In other words, a gap is provided between the other ends of inner wall 6 and outer wall 7 and the inner surface of cabinet 1B and loudspeaker 3. Therefore, sound emitted from loudspeaker 3 to space S11 inside cabinet 1B enters space S12 between inner wall 6 and outer wall 7 and is emitted to the outside from the plurality of through holes 4*a* and also emitted to the outside from opening portion 8.

As described above, the embodiments have been described as examples of the technique of the present disclosure. The attached drawings and detailed descriptions have been provided therefor.

Therefore, in addition to the constituent elements essential for solving the problem, the constituent elements described in the attached drawings and detailed descriptions may include, for the purpose of exemplifying the technique, constituent elements that are not essential for solving the problem. Thus, just because those non-essential constituent elements are described in the attached drawings and detailed descriptions does not mean that those non-essential constituent elements should be immediately acknowledged as being essential constituent elements.

In addition, the embodiments described above are provided for exemplifying the technique of the present disclosure, so various modifications, substitutions, additions, omissions, and the like may be carried out within the scope of the appended claims or the equivalents thereof.

INDUSTRIAL APPLICABILITY

The present disclosure is applicable to a sound reproduction device capable of emitting sound having directionality using a smaller number of loudspeakers.

The invention claimed is:

1. A sound reproduction device comprising:

a casing; and a loudspeaker disposed inside the casing, wherein the casing includes a first wall surface including a plurality of through holes provided in ring-shaped area, the loudspeaker is disposed in an orientation in which sound is emitted toward the plurality of through holes, the casing includes a first space in which the loudspeaker is disposed and a second space through which the first space communicates with an external space outside the casing, and the second space is a cylindrical space formed between an outer wall surface in a cylindrical shape provided along an inner circumference of the ring-shaped area and an inner wall surface in a cylindrical shape that is provided along an outer circumference of the ring-shaped area and opposes the outer wall surface.

2. The sound reproduction device according to claim 1, wherein the plurality of through holes include a plurality of first through holes provided along a first circle, the plurality of first through holes having hole diameters that are same and lengths that are same.

3. The sound reproduction device according to claim 2, wherein the plurality of through holes include a plurality of second through holes provided along a second circle that is inside the first circle and is smaller than the first circle, the plurality of second through holes having hole diameters smaller than the hole diameters of the plurality of first through holes.

4. The sound reproduction device according to claim 3, wherein the second circle is concentric with the first circle.

5. The sound reproduction device according to claim 1, wherein a center axis of the cylindrical shape formed by the outer wall surface and a center axis of the cylindrical shape formed by the inner wall surface coincide.

6. The sound reproduction device according to claim 1, wherein a distance between the outer wall surface and the inner wall surface is constant in a direction of the center axis of the cylindrical shape of the outer wall surface.

7. The sound reproduction device according to claim 1, wherein the distance between the outer wall surface and the inner wall surface is smaller than or equal to ¼ a wavelength of sound emitted from the loudspeaker.

8. The sound reproduction device according to claim 1, wherein the loudspeaker is disposed in an orientation in which a center axis of the loudspeaker in a sound emission direction passes through a center of the ring-shaped area.

9. The sound reproduction device according to claim 1, wherein the casing includes an opening portion in a second wall surface different from the first wall surface, the opening portion being a portion from which sound emitted from the loudspeaker is emitted to outside.

* * * * *